US010743544B2

(12) United States Patent
Jiang et al.

(10) Patent No.: US 10,743,544 B2
(45) Date of Patent: Aug. 18, 2020

(54) METHOD FOR INACTIVATING *CRONOBACTER SAKAZAKII*

(71) Applicant: Northeast Agricultural University, Harbin (CN)

(72) Inventors: Yujun Jiang, Harbin (CN); Chaoxin Man, Harbin (CN)

(73) Assignee: Northeast Agricultural University, Harbin (CN)

( * ) Notice: Subject to any disclaimer, the term of this patent is extended or adjusted under 35 U.S.C. 154(b) by 677 days.

(21) Appl. No.: 15/260,196

(22) Filed: Sep. 8, 2016

(65) Prior Publication Data

US 2017/0142979 A1    May 25, 2017

(30) Foreign Application Priority Data

Nov. 23, 2015    (CN) .......................... 2015 1 0816842

(51) Int. Cl.
| | | |
|---|---|---|
| *A61K 36/87* | (2006.01) | |
| *A01N 65/08* | (2009.01) | |
| *A23C 3/08* | (2006.01) | |
| *A23L 3/3472* | (2006.01) | |
| *A23L 3/3463* | (2006.01) | |
| *A01N 43/16* | (2006.01) | |
| *A23L 3/349* | (2006.01) | |
| *A01N 31/16* | (2006.01) | |

(52) U.S. Cl.
CPC .............. *A01N 65/08* (2013.01); *A01N 31/16* (2013.01); *A01N 43/16* (2013.01); *A23C 3/08* (2013.01); *A23L 3/349* (2013.01); *A23L 3/3463* (2013.01); *A23L 3/3472* (2013.01); *A23L 3/34635* (2013.01)

(58) Field of Classification Search
CPC ...................................... A61K 36/87

USPC .......................................... 424/766
See application file for complete search history.

(56) References Cited

U.S. PATENT DOCUMENTS

2014/0271978 A1*   9/2014   Wittke ................. A23L 29/015
                                                                426/2

FOREIGN PATENT DOCUMENTS

KR       20110024030 A   *   3/2011    ............. B60Q 1/441

OTHER PUBLICATIONS

Kim et al. "Inactivation of Enterobacter sakazakii by water-soluble muscadine seeds extracts", International journal of Food Microbiology 129 (2009) 295-299. (Year: 2009).*
Perumalla et al. "Green tea and grape seed extracts—potential applicatins in food safety and quality" (Food Research International 44 (2011) 827-839). (Year: 2011).*

* cited by examiner

*Primary Examiner* — Michael Barker
*Assistant Examiner* — Deborah A Davis
(74) *Attorney, Agent, or Firm* — Lili Chen

(57) ABSTRACT

The present invention relates to a method for inactivating *Cronobacter sakazakii*, which belongs to the field of food safety technologies. The present invention provides a method to use tea polyphenols as an active ingredient to inactivate *Cronobacter sakazakii*. The invention can be used to control and eliminate the contamination of *Cronobacter sakazakii* in food or food processing, especially the contamination of *Cronobacter sakazakii* during PIF production. The present invention provides an effective method to clean and sterilize the environment and the equipment, especially to clean the inner wall of the equipment which is hard to clean due to biofilms formed inside.

6 Claims, 4 Drawing Sheets

METHOD FOR INACTIVATING *CRONOBACTER SAKAZAKII*

CROSS-REFERENCES AND RELATED APPLICATIONS

This application claims the benefit of priority to Chinese Application No. 201510816842.9, entitled "A Method for Inactivating *Cronobacter Sakazakii*", filed Nov. 23, 2015, which is herein incorporated by reference in its entirety.

BACKGROUND OF THE INVENTION

Field of the Invention

The invention is in the field of food safety technologies. In particular, it relates to a method for inactivating *Cronobacter sakazakii*.

Description of the Related Art

*Cronobacter* spp. (formerly known as *Enterobacter sakazakii*) is an gram-negative, motile, non-spore forming, rod-shaped and facultative anaerobe foodborne pathogen, which can survive at 6° C.~45° C. and grow well at 37° C.~43° C. A few of *Cronobacter* strains can grow slowly above 47° C. or below 0° C. *Cronobacter* can grow in many kinds of culture medium, such as nutrient agar, eosin methylene blue (EMB) agar, tryptone soy agar (TSA) and deoxycholate agar, etc. All of *Cronobacter* strains can rapidly grow on TSA and deoxycholate agar, forming bacterial colonies with a diameter of 1~1.5 mm after cultivation at 36° C. for 24 hours and forming bacterial colonies with a diameter of 2~3 mm and producing yellow pigment after cultivation at 36° C. for 48 hours. *Cronobacter* has strong acid resistance and weak alkaline resistance.

At present, *Cronobacter* spp. has been included in the list of foodborne pathogens, which can be isolated from a wide range of food materials (e.g. meat, cheese, vegetables, grains, herbs, spices and powdered infant formula), environment (e.g. factories and homes) and insects. The CDC testing report between 2010 and 2011 showed that the *Cronobacter* detection rate of 175 food samples from Wuzhou, Guangxi was 5.26%, the *Cronobacter* detection rate of 891 food samples from Suqian, Jiangsu was 2.6%, the *Cronobacter* detection rate of 286 food samples from Changsha, Hunan was 6.3%. The data above suggested that the contamination of *Cronobacter* spp. in food was widely distributed in China.

Research has shown that the sources of *Cronobacter* spp. contamination are mainly from three areas. The first source comes from clinical hospitals. In 1980, Farmer et al. first detected *Cronobacter* from patient's body fluid and secretion, and *Cronobacter* were found in the respiratory tracts of 29 patients in the same hospital 7 months later. The second source is from powdered infant formula. Although there are a lot of living places for *Cronobacter* in the environment, *Cronobacter* in powdered infant formula is directly related to human diseases. Lversen et al. detected *Cronobacter* and Enterobacteriaceae from powdered infant formula and 402 other food materials. The results showed that the detection rate in formula food, dried infant food, milk powder and cheese food were 2.4%, 10.2%, 4.1% and 3.3%, respectively. Other enteric bacteria and *Salmonella* were not detected in these foods. The third source is from the natural environment. *Cronobacter* spp. is widely distributed in the environment. *Cronobacter* was isolated from soil, sewer, plant roots and animal excrement as early as 1974. Therefore, in order to prevent contamination of *Cronobacter*, not only strict monitoring of the food production process is necessary, but strict disinfection of food production environment is also needed.

*Cronobacter* spp. in PIF (powdered infant formula) is classified as a Class A pathogen. The *Cronobacter* contamination in PIF can cause neonatal infection in new born babies and lead to serious diseases, such as bacteremia, necrotizing enterocolitis and cephalomeningitis, which have a death rate as high as 40% to 80%. China is a big PIF production and consumption country. We have been facing the problem of *Cronobacter* contamination that has long time plagued the PIF industry.

Powdered infant formula is a main source of *Cronobacter* spp. contamination and transmission. There are two major ways for *Cronobacter* contamination and transmission. The first way of contamination occurs during the process of raw materials addition and product drying and packaging in PIF production. The second way is contamination of PIF production environment, usage of contaminated equipments or during the process of milk powder reconstitution. *Cronobacter* has strong environmental tolerance, which enables it to survive in final products and the PIF processing environment.

Although PIF is a major source of *Cronobacter* contamination and transmission, it still can be safe to eat as long as its production, processing and consumption are handled properly. Research showed that the PIF treated with high temperature or low temperature can reduce the survival rate of *Cronobacter*. In addition, some food additives can reduce the strains' temperature tolerance, and may directly kill the bacteria. For the production equipment, especially the inner wall of each pipeline which is easy to form biofilms, timely cleaning and effective disinfection are necessary to reduce the risk of *Cronobacter* contamination. For milk powder reconstitution, cleaning and disinfecting the tableware in advance are needed. The temperature of water needs to be higher than 80° C. It's better not to eat the leftover of the dissolved milk to avoid the second contamination of *Cronobacter*. To reduce the risk of *Cronobacter* contamination, continuous monitoring of raw materials and production environment must be carried out. To completely prevent and control *Cronobacter*, there is a urgent need of a safe and effective method for inactivating *Cronobacter*.

In recent years, natural extracts have attracted the attention of researchers because of their natural advantage, convenience and easy access. The antimicrobial effect of natural extracts has also attracted much attention. The use of natural extracts to prevent and control *Cronobacter* contamination becomes the future trend of development.

BRIEF SUMMARY OF THE INVENTION

To solve aforementioned problems, the present invention provides a method for inactivating *Cronobacter Sakazakii* (*C. Sakazakii*) using tea polyphenols as the active ingredient. The method for killing *Cronobacter Sakazakii* and preventing *Cronobacter Sakazakii* contamination can be performed as follows:

In one embodiment of the present invention, tea polyphenols are dissolved in normal saline or water, *Cronobacter sakazakii* contaminants are treated with tea polyphenols solution to inactivate *Cronobacter sakazakii*;

In one embodiment of the present invention, tea polyphenols and other bactericidal or antimicrobial chemicals are dissolved in normal saline or water to obtain a mixed solution, *Cronobacter sakazakii* contaminants are treated with the mixed solution to inactivate *Cronobacter sakazakii*;

In one embodiment of the present invention, tea polyphenols are directly dissolved in a matrix solution (a matrix solution is a solution or suspension in which additional components may be added. For example, rehydrated PIF, normal saline or water can be used as a matrix solution), and the pH of the tea polyphenol solution is adjusted, and *Cronobacter sakazakii* contaminants are treated with the tea polyphenol solution to inactivate *Cronobacter sakazakii*;

In one embodiment of the present invention, tea polyphenols and other bactericidal or antimicrobial chemicals are dissolved in a matrix solution, and the pH of the matrix solution is adjusted, and *Cronobacter sakazakii* contaminants are treated with the above solution to inactivate *Cronobacter sakazakii*.

In a preferred embodiment of the present invention, the mass concentration of the tea polyphenols in is 0.3%~3%.

In a preferred embodiment of the present invention, the mass concentration of the tea polyphenols is 0.3%~3% and the pH of the tea polyphenol solution is adjusted to be 3-5.

In a preferred embodiment of the present invention, the matrix solution is an acidic food.

In a preferred embodiment of the present invention, the acidic food is acidic drinks, acidic milk drinks or yoghurt.

In an preferred embodiment of the present invention, other bactericidal or antimicrobial chemicals are chosen from the group consisting of ascorbic acid, malic acid, and citric acid.

In one embodiment of the present invention, tea polyphenols are dissolved in normal saline or water with a mass concentration of 0.3%~3%, *Cronobacter sakazakii* contaminants are treated with tea polyphenol solution for no less than one hour to inactivate *Cronobacter sakazakii*.

In one embodiment of the present invention, tea polyphenols and other bactericidal or antimicrobial chemicals are dissolved in normal saline or water to obtain a mixed solution, *Cronobacter sakazakii* contaminants are treated with the mixed solution for no less than 1 hour to inactivate *Cronobacter sakazakii*; and the mass concentration of the tea polyphenols is 0.3%~3%. The other bactericidal or antimicrobial chemicals are one or more acids selected from ascorbic acid, malic acid, and citric acid.

In one embodiment of the present invention, tea polyphenols are dissolved in the matrix solution with the pH adjusted to 3-5, *Cronobacter sakazakii* contaminants are treated with the above solution for no less than 7 hour to inactivate *Cronobacter sakazakii*.

In one embodiment of the present invention, tea polyphenols and other bactericidal or antimicrobial components are dissolved in the matrix solution, and the pH is adjusted to 3-5, *Cronobacter sakazakii* contaminants are treated with above solution for no less than 7 hour to inactivate *Cronobacter sakazakii*, wherein the mass concentration of the tea polyphenols is 0.3%~3%.

Any of the above methods can be applied to prevent, control and eliminate the contamination of *Cronobacter sakazakii* in food or food production process, and to treat *Cronobacter sakazakii* contaminants or contaminated environment.

The present invention has the following benefits:

1) The present invention provides a method of using acidified tea polyphenols to inactivate *Cronobacter*. It provides a new venue for using natural extracts to prevent and control *Cronobacter*. It provides new cleaning and evaluation methods to better control and eliminate the contamination of *Cronobacter*. It provides guidance to dairy production and safety in terms of *Cronobacter* prevention and control.

2) Based on the preliminary studies of the inactivation mechanism of tea polyphenols on *Cronobacter*, it is found that tea polyphenols can destroy the structure of the bacterial cell, and it has an irreversible and strong bactericidal effect on *Cronobacter*. Tea polyphenols can prevent resurrection and secondary contamination of *Cronobacter*. As tea polyphenols are natural extracts, it is relatively safe to use them in the food sterilization process.

3) The method of the present invention can be used to control and eliminate the contamination of *Cronobacter*, especially during the production of PIF. The method is a great cleaning and disinfection method for effectively reducing the survival of *Cronobacter* in PIF production equipment and environment, especially in inner walls of production pipelines where biofilms can easily form.

4) The method of the invention is simple and easy to practice, and can be applied in a wide range of applications.

DETAILED DESCRIPTION OF THE INVENTION

Figure 1:
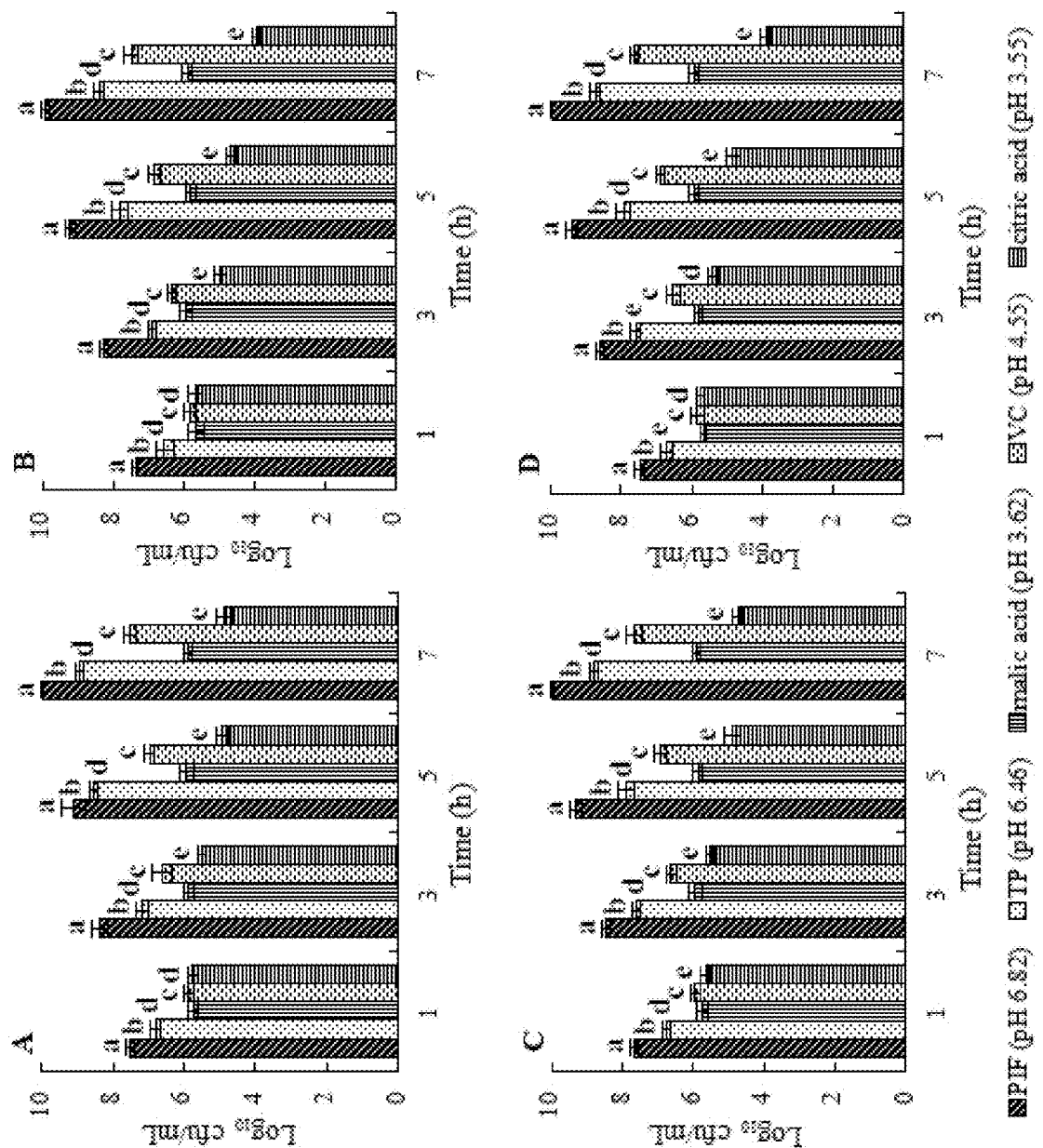
FIG. 1. Tolerance of *Cronobacter sakazakii* strains ES45, ES46, ES37, and ES39 to different natural extracts. A, *Cronobacter sakazakii* ES45; B, *Cronobacter sakazakii* ES46; C, *Cronobacter sakazakii* ES37; D, *Cronobacter sakazakii* ES39. (PIF: powdered infant formula, TP: tea polyphenols, VC: ascorbic acid)

The following examples are provided by way of illustration only, not by way of limitation. It is not intended to use these examples to limit the scope of the invention, which is only defined by the appended claims.

Bacterial suspension used in the Examples is *Cronobacter sakazakii* cell suspension, and samples used in the Examples are free from *Cronobacter* infection before addition of *Cronobacter sakazakii*.

*Cronobacter Sakazakii* isolated from Chinese PIF and its processing environment is used as the study subject. Four *C. sakazakii* strains, ES37 (ST8), ES39 (ST1), ES45 (ST4) and ES46 (ST64), were identified by multilocus sequence typing, and selected as representative strains in the Examples.

Preparation of *C. sakazakii* Cell Suspensions

After *C. sakazakii* cells were cultured in a LB broth at 37° C. for 12 hours, 2 mL of culture medium was transferred to a sterile centrifuge tube and centrifuged at 8000×g for 10 min, then washed twice with normal saline (NS) at room temperature. The supernatants were discarded and the pellets were re-suspended in 1 mL of sterile NS to obtain cell suspensions with a final concentration of approximately 8.0 Log CFU/mL. For enumeration, 0.1 mL of the cell suspensions were streaked in duplicate on Tryptic Soy Agar (TSA) plates after serial dilution in NS and incubated at 37° C. for 24 hours.

Example 1. The Tolerance of *Cronobacter sakazakii* to Tea Polyphenols

1. The Antibacterial Activity of Tea Polyphenol Solutions on *C. sakazakii*

0.3 g, 0.5 g, 1 g, 2 g and 3 g of the tea polyphenols (TP) were separately dissolved in 100 mL saline. 8.0 Log CFU/mL cell suspensions of *C. sakazakii* were added to tea polyphenol solutions to obtain a final concentration of approximately 7.0 Log CFU/mL. The cell suspensions with different amounts of tea polyphenol were incubated at 37° C. for 7 hours, and then mixed to make sure that the solution was homogeneous. After serial dilution with NS, 0.1 mL of appropriately diluted cultures were spread-plated on TSA plates in duplicate and incubated upside down at 37° C. overnight to observe the growth of *C. sakazakii*. The physiological saline and the physiological saline with the same pH as tea polyphenol solution were separately used as the control groups. The results were as follows: no *C. sakazakii* was detected after 7 hours of incubation in the TP solutions, and *Cronobacter sakazakii* survived in the normal physiological saline and the physiological saline with the same pH as tea polyphenol solutions. The results showed that tea polyphenols have antibacterial activity.

2. Comparison of Bactericidal Activity of Tea Polyphenol Solutions in Different Concentrations 0.1 g, 0.2 g, 1 g, 0.3 g, 0.5 g, 1 g, 3 g, 5 g of the tea polyphenols (TP) were separately dissolved in 100 mL NS. 1 mL 8.0 Log CFU/mL cell suspensions of *C. sakazakii* were added to the above TP solutions to obtain final concentrations of approximately 7.0 Log CFU/mL. The cell suspensions with different treatments were incubated at 37° C. for 7 hours, and taken out the incubator and mixed to make sure that they were homogeneous. After serial dilution with the saline, 0.1 mL of appropriately diluted cultures were spread-plated on TSA plates in duplicate and incubated upside down at 37° C. overnight to observe the growth of *Cronobacter sakazakii*. The physiological saline was used as the control groups. The results were shown in Table 1.

TABLE 1

| | bactericidal effect of tea polyphenol solutions | | | | | | |
|---|---|---|---|---|---|---|---|
| Strain | Mass concentration of TP/% | | | | | | |
| number | 0 | 0.1 | 0.2 | 0.3 | 0.5 | 1 | 3 |
| ES37 | + | + | − | − | − | − | − |
| ES39 | + | + | + | − | − | − | − |
| ES45 | + | + | + | − | − | − | − |
| ES46 | + | + | − | − | − | − | − |

Note:
"+" means survival, "−" means death

Table 1 showed that the tea polyphenols solution had the best bactericidal effect with the concentration of 0.3%~3%

Example 2. The Tolerance of *Cronobacter sakazakii* to Different Natural Extracts The tea polyphenols was added into liquid milk. Due to pH buffering effect of liquid milk, the TP milk solution could not have the acid pH required for tea polyphenols to perform anti-bacterial function. This example studied the conditions for tea polyphenols to kill *C. sakazakii* in the liquid milk.

1. Preparation of Solutions

A commercial PIF (Wondersun, Harbin, Hei Longjiang Province, China) was purchased and reconstituted according to the manufacturer's instruction. Briefly, 15 g of the PIF was reconstituted in 100 mL of sterile distilled water. 5 mg/mL TP, malic acid, citric acid or ascorbic acid (VC) was added to the rehydrated PIF, and shaken gently to make sure that it was fully dissolved. A pH meter was used to determine the pH of all the solutions. The initial pH of rehydrated PIF was 6.82 and it dropped to pH 3.62, pH 3.55, pH 4.55 and pH 6.46 after added 5 mg/mL malic acid, citric acid, VC and TP, respectively. The final concentration of the natural extract solutions was 0.5% and the milk powder solutions were packed into different test tubes with 9 ml solution in each tube. Milk powder solution without any natural extract product was used as the control group.

2. Treatment of *C. sakazakii* with Different Natural Extract Solutions 1 mL of 8.0 Log CFU/mL cell suspensions of four *C. sakazakii* strains were separately added to 9 mL rehydrated PIF with different natural extracts prepared above to obtain final concentrations of approximately 7.0 Log CFU/mL. The cell suspensions with different natural extracts were incubated at 37° C. for 1, 3, 5 and 7 hours, and mixed to make sure that the solutions were homogeneous. After serial dilution with NS, 0.1 mL of appropriately diluted cultures were spread-plated on TSA plates and incubated upside down at 37° C. overnight to observe the growth of *Cronobacter sakazakii*.

The tolerance of four different ST types of *Cronobacter sakazakii* to different natural extracts was studied by serial dilution plate count method. The cell suspensions were separately added to PIF containing 0.5% tea polyphenols, 0.5% VC, 0.5% malic acid or 0.5% citric acid. The pH of each solution was measured using a pH meter and the plate count analysis was carried out at different time points of incubation. The results were shown in FIG. 1.

According to the FIG. 1, we found that all four strains in the infant formula milk powder solution (pH 6.82) had a rapid growth trend. *C. sakazakii* strains treated with 0.5% TP in PIF (pH 6.46) and 0.5% VC in PIF (pH 4.55) had shown a slower growth trend. The number of bacteria in PIF containing 0.5% malic acid (pH 3.55) did not change much over the 7 hours of incubation. Only *C. sakazakii* strains in PIF containing 0.5% citric acid (pH 4) had shown a downward trend. The results showed that citric acid in PIF had some antibacterial effect, the antibacterial effect of VC and malic acid was not obvious, and the antibacterial effect of tea polyphenols in PIF was relatively poor. In addition, the results showed that there were significant differences ($p<0.05$) at different time points for the same treatment. The order of inhibition strength by different treatments was showed as below: malic acid (pH 3.62)>citric acid (pH 3.55)>VC (pH 4.55)>TP (pH 6.46). The addition of natural extracts into PIF changes the pH of the solutions. In order to eliminate the influence caused by the difference in acidity, it was necessary to have the same pH for every treatment group.

This example investigated the tolerance of four *C. sakazakii* strains to different natural extracts. The rehydrated PIF was used as the matrix solution, and 0.5% TP (pH 6.46), VC (pH 4.55), malic acid (pH 3.55) or citric acid (pH 3.62) was added into the PIF solution. The PIF without adding any substance (pH 6.82) was used as the blank control. The results showed that citric acid had some antibacterial effect, and the antibacterial effect of tea polyphenols, VC and malic acid in PIF were not obvious. The order of antimicrobial strength of the natural extracts was shown as below: citric acid (pH 3.62)>malic acid (pH 3.55)>VC (pH 4.55)>tea polyphenols (pH 6.46). Although the pH after the addition of 0.5% malic acid was down to 3.55, which was lower than that of the citric acid solution, the results showed that the bactericidal effect of citric acid was better than that of malic acid. Citric acid, malic acid and VC are organic acids. Reports have shown that inhibitory effect of organic acids depends on its dissociation forms, and only undissociated form of organic acids had desirable antimicrobial effect. Dissociative form of organic acids had no significant antibacterial effect. The organic acid in its undissociated form is lipophilic. It enters the cytoplasm by passive diffusion. Since the intracellular pH is close to 7, organic acid is dissociated to release $H^+$ after entering the cytoplasm, lowering the pH inside the cells. With the increase of intracellular $H^+$ concentration, bacteria rely on the ATP enzyme to pump extra $H^+$ out of the cell. This process is very energy consuming, and it can cause bacteria to die of exhaustion. In addition, a large number of anions accumulated inside the cells lead to the change of osmotic pressure of the cells, which results in cell toxicity, such as cessation of nucleic acid synthesis and glycolysis, disorder of enzymatic transduction, and inhibition of enzymatic hydrolysis reaction.

Example 3. The Tolerance of Different *Cronobacter sakazakii* Strains to Acidified Natural Extracts Preparation of Solution A commercial PIF (Wondersun, Harbin, Hei Longjiang Province, China) was purchased and reconstituted according to the manufacturer's instruction. Briefly, 15 g of the PIF was reconstituted in 100 mL of sterile distilled water. 5 mg/mL TP was added to the rehydrated PIF and shaken gently to make sure it was fully dissolved. As controls, malic acid, citric acid and VC were dissolved in PIF in the same way as that of TP. A pH meter was used to determine the pH of all solutions. The initial pH of rehydrated PIF was 6.82 and the value of pH dropped to pH 3.62, pH 3.55, pH 4.55 and pH 6.46 after addition of 5 mg/mL malic acid, citric acid, VC and TP, respectively. The final concentration of the natural extract solutions was 0.5% (w/v) and PIF solutions were packed into different test tubes, each tube with 9 mL solution. PIF solution without adding additional substance was used as the blank control group.

Acidification Treatment of Different Natural Extract Solution

In order to eliminate the effect of pH on the growth of *Cronobacter sakazakii*, it is necessary to adjust the pH for each treatment group to be the same. The pH of all the treatment groups was adjusted to pH 3.55 with 4 M HCl and 4M NaOH, which was the minimum pH of all the treatment solutions. The PIF acidified with HCl was used as the control. 1 mL of 8.0 Log CFU/mL cell suspensions of the four *C. sakazakii* strains were separately added to 9 mL acidified PIF with different natural extracts. PIF without adding other substance was used as the blank control. The culture condition of the *C. sakazakii* was the same as described in Example 2.

Figure 2:
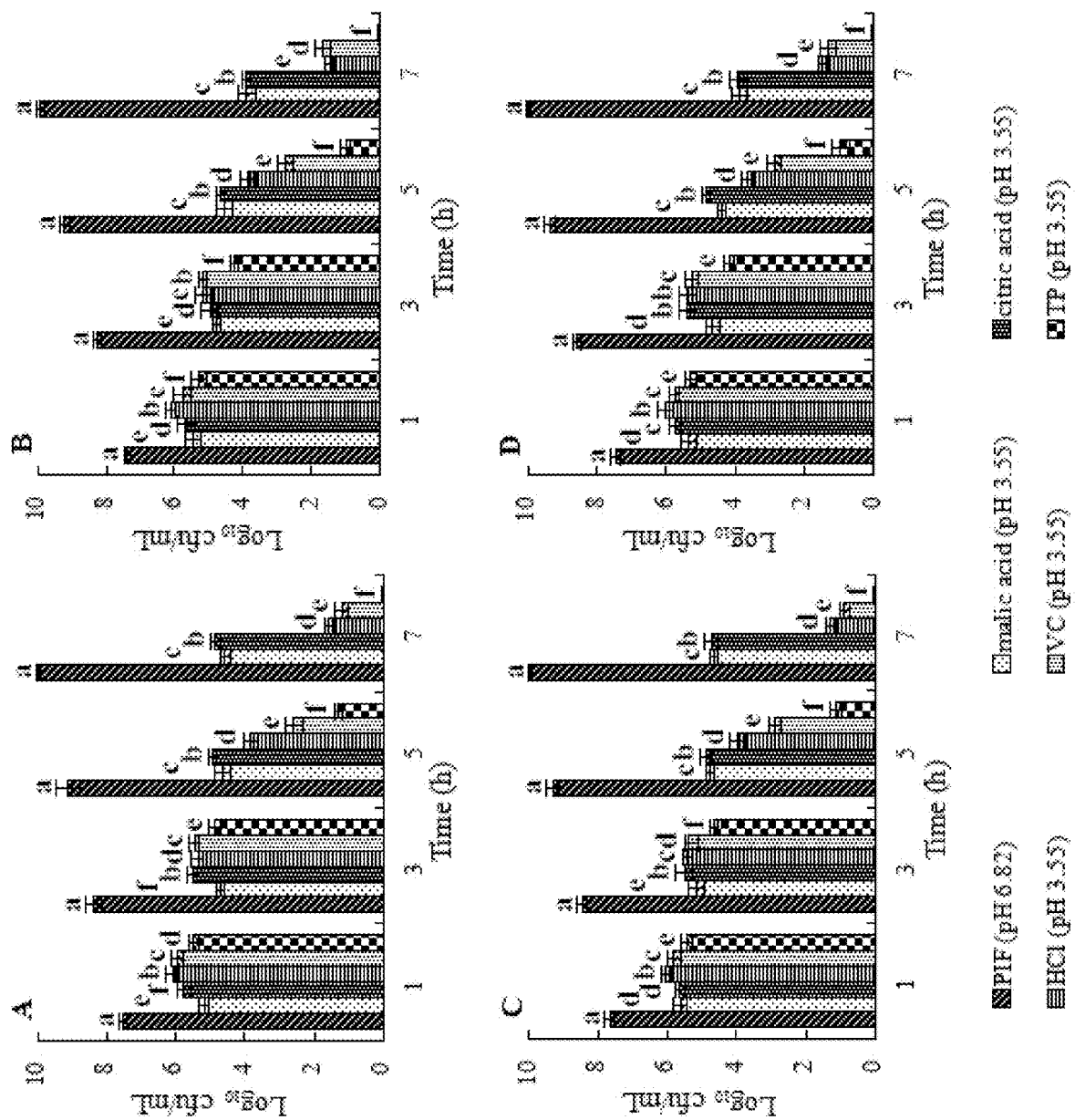
FIG. 2. Tolerance of *Cronobacter sakazakii* strains ES45, ES46, ES37 and ES39 to different acidified natural extracts. A, *Cronobacter sakazakii* ES45; B, *Cronobacter sakazakii* ES46; C, *Cronobacter sakazakii* ES37; D, *Cronobacter sakazakii* ES39.
Figure 3:
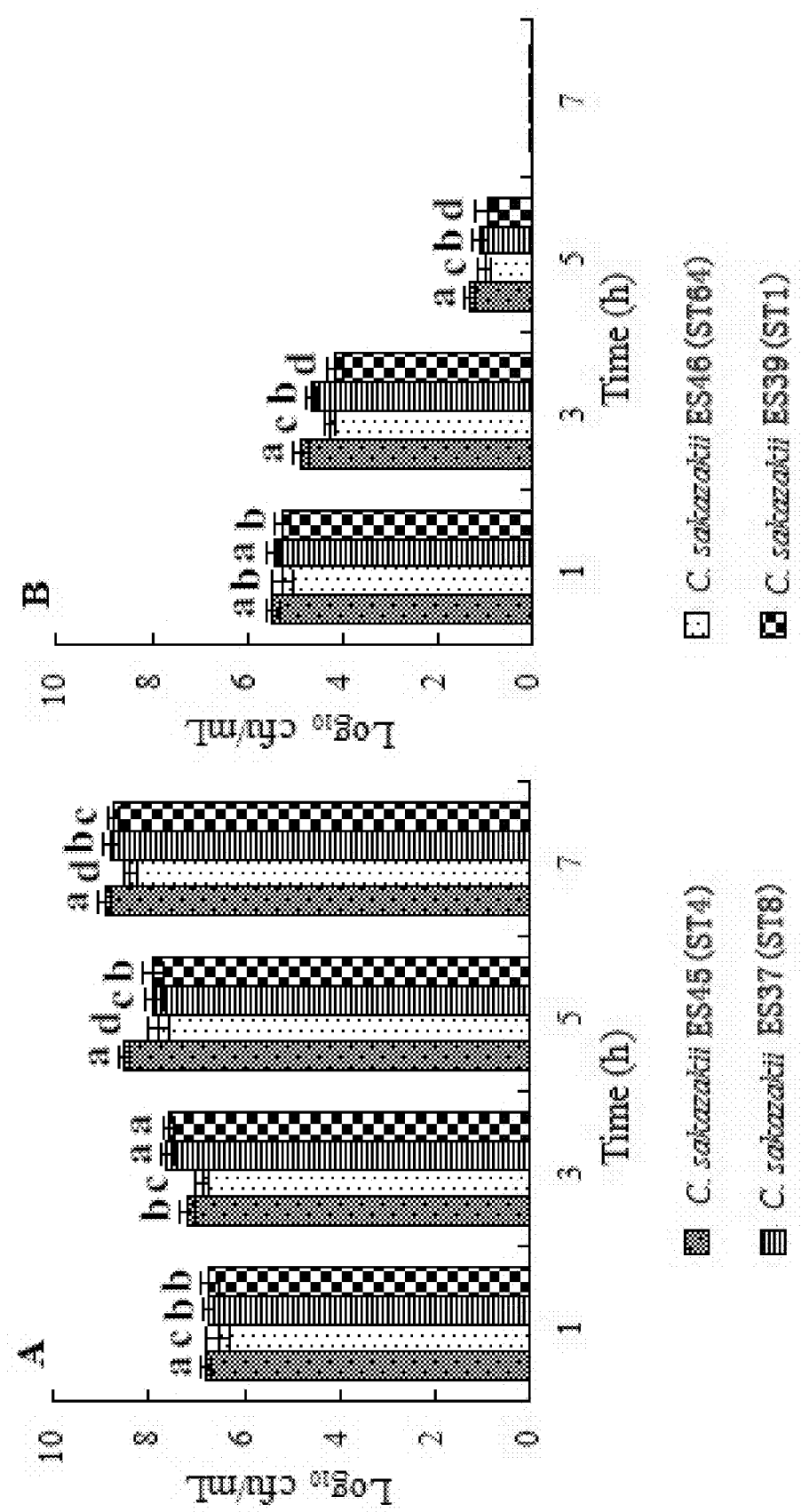
FIG. 3. Tolerance of *Cronobacter sakazakii* strains to tea polyphenols and acidified tea polyphenols. A, tea polyphenols; B, acidified tea polyphenols.

The experimental results on the tolerance of four *C. sakazakii* strains to different natural extracts (pH 3.55) were shown in FIG. 2. The results showed that all the four strains had exhibited a rapid growth in PIF (pH 6.82). On the contrary, the number of bacteria in the other five treatment groups showed a downward trend, and the number of viable *C. sakazakii* was significantly different (p<0.05) at different time points for the same treatment group. Among them, the tea polyphenols (pH 3.55) had the strongest antibacterial effect. When treated with the TP solution (pH 3.55) for 7 hours, all the four strains were completely inactivated. The VC after acidification treatment showed stronger antibacterial activity than before. The inhibitory effect of citric acid before and after acidification were not significantly different. This may be due to the small pH change before and after acidification of citric acid solution. PIF with HCl acidification also showed some inhibitory effect. Overall, the inhibitory effect of the various natural extracts after acidification had been enhanced, and acidified tea polyphenols had the strongest antimicrobial effect.

The pH of the PIF solution changed after adding different natural extracts. Therefore, the pH of all the PIF solutions containing natural extracts was adjusted to 3.55 using 4M HCl, which was the lowest pH of all the treatment solutions. The experimental results showed that acidified tea polyphenols had the strongest antibacterial effect. Organic acids exert the antimicrobial effect mainly by changing the pH inside the cell. The VC after acidification treatment showed stronger antibacterial activity than before the treatment. The inhibitory effect of citric acid before and after acidification was not significant. This may be due to the small pH change. PIF with HCl acidification also showed some antimicrobial effect. Overall, the inhibitory effect of the various natural extracts after acidification had been enhanced. This might be due to a synergistic action between inorganic acid HCl and the organic acid. Under the condition of low pH, the organic acids exhibited mostly as non-dissociated form, which enhanced their antibacterial effect. The tea polyphenols showed a much stronger antibacterial effect after acidification.

Example 4. Recovery of the Stressed *C. sakazakii* Cells after Tea Polyphenol Treatments The matrix solution used in the above examples was PIF, in which the tolerance of *C. sakazakii* to different natural extracts and acidified natural extracts were studied. In order to better study the tolerance of *C. sakazakii* to natural extracts, the normal saline (normal saline (NS) is a solution composed of 0.85 to 0.95 percent salt in distilled water. The most frequently used salt is sodium chloride, and it can be sodium phosphate as well.) was used as the matrix solution. 9 mL of 0.5% TP dissolved in 0.85% NS and 1 mL of 8.0 Log CFU/mL cell suspensions were added together. The cell suspensions were incubated at 37° C. for 1, 3, 5 and 7 hours. After serial dilution with 0.85% NS, the cultures were spread-plated on TSA plates and incubated upside down at 37° C. overnight to observe the growth of *C. sakazakii*.

The results showed that, for all the four *C. sakazakii* strains, no viable cells was detected after the treatment with acidified 0.5% TP in PIF for 7 hr or 0.5% TP in 0.85% normal saline for 1 hr. Recovery of the stressed *C. sakazakii* cells after TP treatment was studied to further test the antibacterial effect of TPs.

After treatment with 0.5% acidified TP in rehydrated PIF for 7 hr or 0.5% TP in 0.85% NS for 1 hr, the four *C. sakazakii* strains were immediately transferred to fresh LB broth or PIF, and incubated at 37° C. for 6 hr and 12 hr to assess bactericidal or bacteriostatic activity of TP. The number of viable *C. sakazakii* cells were determined by plating 0.1 mL of appropriate diluents on TSA plates, and incubating the plates at 37° C. for overnight. Finally, count the number of colonies of *Cronobacter sakazakii* growing on the TSA plates.

After the four *C. sakazakii* strains treated with 0.5% TP in PIF (pH 3.55) for 7 hr or in NS for 1 hr, the cell suspensions was added into LB broth and PIF solution for the recovery test. As shown in Table 2, the recovery test results indicated that the four *C. sakazakii* strains after the treatment with 0.5% TP acidified with HCl in PIF for 7 hr showed no growth after 6 hr and 12 hr incubation in fresh recovery (LB broth or PIF) media. Similarly, no *C. sakazakii* cells were able to restore growth in LB broth or PIF media after treatment with 5 mg/mL TP in NS (pH 3.47) for 1 hr. These results indicated that TPs have a bactericidal activity rather than just antimicrobial effect against *C. sakazakii* cells. The damage to *C. sakazakii* cells caused by TPs was not repairable.

TABLE 2

Recovery experiments of acidified TP's toxicity against *C. sakazakii* strains

| Treatment under different conditions | | Survival bacterial count (LogCFU/mL) | | | | | | |
|---|---|---|---|---|---|---|---|---|
| | | ES39 | | ES45 | | ES37 | | ES46 |
| | TIME | LB | PIF | LB | PIF | LB | PIF | LB | PIF |
| A group | 6 h | − | − | − | − | − | − | − | − |
| | 12 h | − | − | − | − | − | − | − | − |
| B group | 6 h | − | − | − | − | − | − | − | − |
| | 12 h | − | − | − | − | − | − | − | − |

Note:
A group: *C. sakazakii* cells were treated with 0.5% TPs in PIF for 7 hr;
B group: *C. sakazakii* cells were treated with 0.5% TPs in the normal saline for 1 hr;
"−" means no survival bacterial count Example 5. The Mechanism of TP's Bactericidal Activity Against *C. sakazakii*

In order to study the mechanism underlying the bactericidal effect of tea polyphenols against *C. sakazakii*, the *C. sakazakii* strains treated with TP in NS for 1 hr were examined by a transmission electron microscope (TEM), and the *C. sakazakii* strains cultured in LB broth for 1 hr were observed as controls.

Figure 4:
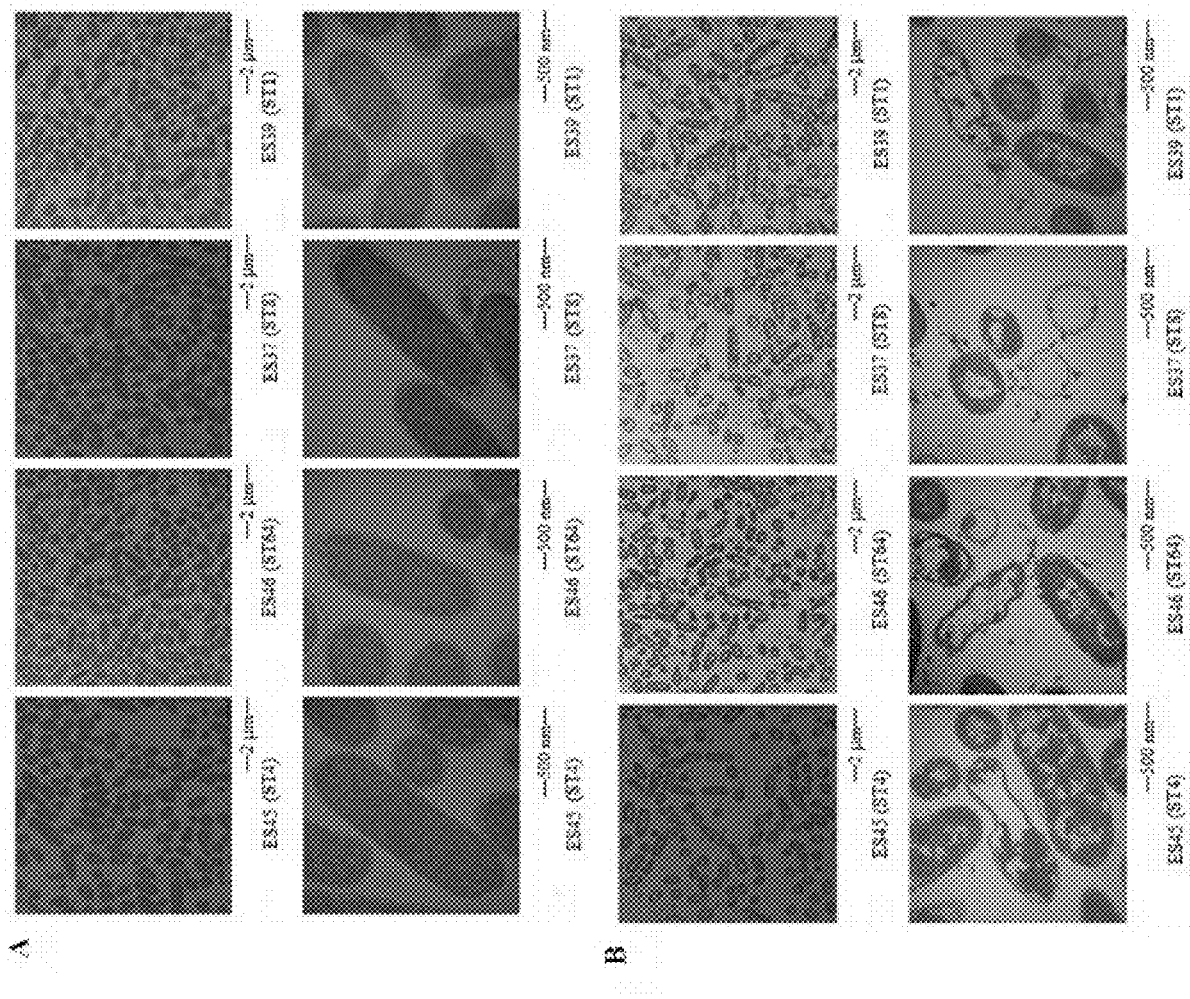
FIG. 4. The electron micrographs of *Cronobacter sakazakii* strains growing in different media. A, in the LB broth; B, in the normal saline with 0.5% tea polyphenols.

The four *C. sakazakii* ST strains treated with TP in NS for 1 hr and the ones incubated in LB broth for 1 hr were examined by TEM (see FIG. 4). Observed under the electron microscope, *C. sakazakii* grown in LB broth showed a rod shape with a smooth edge, the interior of the cell is full of contents, and the cytoplasm and cell wall were closely fitted (see FIG. 4A). For cells treated in TP solution, all of four *C. sakazakii* strains showed similar characteristics, that is, the cell wall was destroyed and the cell morphology was altered to different degrees, which led to the overflow of inner cytoplasm and finally resulted in the death of the cells. It is clearly shown that tea polyphenols have irreversible bactericidal effect on *C. sakazakii*, and they can destroy the bacterial cell structure.

Example 6. The Bactericidal Effects of Tea Polyphenol in PIF Solution with Different pHs 15 g PIF was reconstituted in 100 mL of sterile distilled water, and 5 mg/mL TP was added to the rehydrated PIF, and shaken gently to make sure that is was fully dissolved. The initial pH of rehydrated PIF was 6.46, and was adjusted to pH 3, 3.5, 4, 5 or 6 with 4 M HCl. 8.0 Log CFU/mL cell suspensions of *C. sakazakii* strains were added to TP solutions with different pHs, and the final concentration was approximately 7.0 Log CFU/mL. The cell suspensions with different treatments was incubated at 37° C. for 7 hr, and shaken to make sure that they were homogeneous. After serial dilution with the saline, 0.1 mL of appropriately diluted cultures were spread-plated on TSA plates in duplicate and incubated upside down at 37° C. overnight. Finally, the growth of *Cronobacter sakazakii* was observed. Cells cultured in the normal saline was used as control groups. The results were shown in table 3.

TABLE 3

Comparison of bactericidal effect of tea polyphenol solutions with different pHs

| Strain number | pH | | | | |
|---|---|---|---|---|---|
| | 3.0 | 3.5 | 4 | 5 | 6 |
| ES37 | − | − | − | − | − |
| ES39 | − | − | − | − | + |
| ES45 | − | − | − | − | − |
| ES46 | − | − | − | − | + |

Note:
"+" means survival, "−" means death

Table 3 showed that the tea polyphenols solution has the best bactericidal effect in pH 3-5.

2. Comparison of Bactericidal Effect of Tea Polyphenols in PIF Solution at Different Concentrations 15 g PIF was reconstituted in 100 mL of sterile distilled water. 0.1 g, 0.2 g, 1 g, 0.3 g, 0.5 g, 1 g, 3 g, and 5 g tea polyphenols were separately dissolved in 100 mL above PIF solution, and the pH was adjust to 3.5. 1 mL 8.0 Log CFU/mL cell suspension of the *C. sakazakii* strains were separately added to the TP solutions to obtain a final concentration of approximately 7.0 Log CFU/mL. The cell suspensions with different TP treatments were incubated at 37° C. for 7 hr, and were shaken to make sure that they were homogeneous. After serial dilution with the saline, 0.1 mL appropriately diluted cultures were spread-plated on TSA plates in duplicate and incubated upside down at 37° C. overnight. Finally, the growth of *Cronobacter sakazakii* was observed. Cells incubated in the physiological saline was used as the control groups. The results were shown in table 4.

TABLE 4

Comparison of bactericidal effect of tea polyphenol in PIF solution at different concentrations

| Strain number | Mass concentration of TP/% | | | | | | |
|---|---|---|---|---|---|---|---|
| | 0.1 | 0.2 | 0.3 | 0.5 | 1 | 2 | 3 |
| ES37 | + | − | − | − | − | − | − |
| ES39 | + | + | − | − | − | − | − |
| ES45 | + | + | − | − | − | − | − |
| ES46 | + | − | − | − | − | − | − |

Note:
"+" means survival, "−" means death

Table 4 showed that the tea polyphenols in PIF solution has the best bactericidal effect at the range of 0.3%-3%.

Example 7. Use of TP Solution (3%) to Clean PIF Production Equipment and Environment 3 g tea polyphenols was dissolved in 100 mL NS. Equipment, pipeline and environment in the factory, which have been already identified to be contaminated by *Cronobacter sakazakii*, were treated with above TP solution for 60 min After the TP treatment, no bacteria were detected in samples taken from the equipment, pipeline and environment previously contaminated by *Cronobacter sakazakii*. The bactericidal effect of the TP solution was quite obvious. To apply the TP treatment, the TP solution was used to wash the equipment and the pipeline, and to spray into the surrounding environment.

Example 8. Use of TP Solution (2%) to Clean PIF Production Equipment and Environment 2 g tea polyphenols was dissolved in 100 mL NS. Equipment, pipeline and environment in the factory were treated with above TP solution for 60 min, which have been already identified to be contaminated by *Cronobacter sakazakii*. After the TP treatment, no bacteria were detected in samples taken from the equipment, pipeline and environment previously contaminated by *Cronobacter sakazakii*. The bactericidal effect of the TP solution was quite obvious. To apply the TP treatment, the TP solution was used to wash the equipment and the pipeline, and to spray into the surrounding environment.

Example 9. Use of TP Solution (0.3%) to Clean PIF Production Equipment and Environment 0.3 g tea polyphenols was dissolved in 100 mL NS. Equipment, pipeline and environment in the factory were treated with above TP solution for more than 1 hr, which have been already identified to be contaminated by *Cronobacter sakazakii*. After the TP treatment, no bacteria were detected in samples taken from the equipment, pipeline and environment previously contaminated by *Cronobacter sakazakii*. The bactericidal effect of the TP solution was quite obvious. To apply the TP treatment, the TP solution was used to wash the equipment and the pipeline, and to spray into the surrounding environment.

Example 10. Use of TP Solution (1%) to Clean PIF Production Equipment and Environment 1 g tea polyphenols was dissolved in 100 mL NS. Equipment, pipeline and environment in the factory were treated with above TP solution for 60 min, which have been already identified to be contaminated by *Cronobacter sakazakii*. After the TP treatment, no bacteria were detected in samples taken from the equipment, pipeline and environment previously contaminated by *Cronobacter sakazakii*. The bactericidal effect of the TP solution was quite obvious. To apply the TP treatment, the TP solution was used to wash the equipment and the pipeline, and to spray into the surrounding environment.

Example 11. Use of TP Solution (1%) and Other Organic Acid to Clean PIF Production Equipment and Environment 1 g tea polyphenols and 0.5 g VC were dissolved in 100 mL NS. Equipment, pipeline and environment in the factory were treated with above TP solution for 60 min, which have been already identified to be contaminated by *Cronobacter sakazakii*. After the TP treatment, no bacteria were detected in samples taken from the equipment, pipeline and environment previously contaminated by *Cronobacter sakazakii*. The bactericidal effect of the TP solution was quite obvious. To apply the TP treatment, the TP solution was used to wash the equipment and the pipeline, and to spray into the surrounding environment.

Example 12. Use of TP Solution (1%) and Other Organic Acid to Clean PIF Production Equipment and Environment 1 g tea polyphenols and 0.3 g citric acid were dissolved in 100 mL NS. Equipment, pipeline and environment in the factory were treated with above TP solution for more than 1 hr, which have been already identified to be contaminated by *Cronobacter sakazakii*. After the TP treatment, no bacteria were detected in samples taken from the equipment, pipeline and environment previously contaminated by *Cronobacter sakazakii*. The bactericidal effect of the TP solution was quite obvious. To apply the TP treatment, the TP solution was used to wash the equipment and the pipeline, and to spray into the surrounding environment.

Example 13. Use of TP Solution (2%) to Clean Contaminated Rooms 2 g tea polyphenols was dissolved in 100 mL NS. Kitchen, bedrooms and other rooms that were contaminated with *C. sakazakii* were treated with above TP solution for more than 1 hr. Samples were taken from contaminated kitchen, bedroom, other rooms and the air. After the TP treatment, no *C. sakazakii* cells were detected in the kitchen, bedrooms, other rooms and the air previously contaminated by *C. sakazakii*. The bactericidal effect of the TP solution was quite obvious. To apply the TP treatment, the TP solution was painted to the contaminated object or sprayed into the surrounding environment.

Example 14. Use of TP Solution (3%) to Clean Contaminated Rooms 3 g tea polyphenols was dissolved in 100 mL NS. Kitchen, bedrooms and other rooms that were contaminated with *C. sakazakii* were treated with above TP solution for more than 1 hr. Samples were taken from contaminated kitchen, bedroom, other rooms and the air. After the TP treatment, no *C. sakazakii* cells were detected in the kitchen, bedrooms, other rooms and the air previously contaminated by *C. sakazakii*. The bactericidal effect of the TP solution was quite obvious. To apply the TP treatment, the TP solution was painted to the contaminated object or sprayed into the surrounding environment.

Example 15. Use of TP Solution (1%) to Clean Contaminated Rooms 1 g tea polyphenols was dissolved in 100 mL NS. Kitchen, bedrooms and other rooms that were contaminated with *C. sakazakii* were treated with above TP solution for more than 1 hr. Samples were taken from contaminated kitchen, bedroom, other rooms and the air. After the TP treatment, no *C. sakazakii* cells were detected in the kitchen, bedrooms, other rooms and the air previously contaminated by *C. sakazakii*. The bactericidal effect of the TP solution was quite obvious. To apply the TP treatment, the TP solution was painted to the contaminated object or sprayed into the surrounding environment.

Example 16. Use of TP Solution (1%) to Clean Contaminated Rooms 0.3 g tea polyphenols was dissolved in 100 mL NS. Kitchen, bedrooms and other rooms that were contaminated with *C. sakazakii* were treated with above TP solution for more than 1 hr. Samples were taken from contaminated kitchen, bedroom, other rooms and the air. After the TP treatment, no *C. sakazakii* cells were detected in the kitchen, bedrooms, other rooms and the air previously contaminated by *C. sakazakii*. The bactericidal effect of the TP solution was quite obvious. To apply the TP treatment, the TP solution was painted to the contaminated object or sprayed into the surrounding environment.

Example 17. Use of TP Solution (0.3%) and Other Organic Acid to Clean Contaminated Rooms 0.3 g tea polyphenols and 0.5 g malic acid were dissolved in 100 mL NS. Kitchen, bedrooms and other rooms that were contaminated with *C. sakazakii* were treated with above TP solution for more than 1 hr. Samples were taken from contaminated kitchen, bedroom, other rooms and the air. After the TP treatment, no *C. sakazakii* cells were detected in the kitchen, bedrooms, other rooms and the air previously contaminated by *C. sakazakii*. The bactericidal effect of the TP solution was quite obvious. To apply the TP treatment, the TP solution was painted to the contaminated object or sprayed into the surrounding environment.

Example 18. Use of TP Solution (1%) and Other Organic Acid to Clean Contaminated Rooms 1 g tea polyphenols and 0.3 g citric acid were dissolved in 100 mL NS. Kitchen, bedrooms and other rooms that were contaminated with *C. sakazakii* were treated with above TP solution for more than 1 hr. Samples were taken from contaminated kitchen, bedroom, other rooms and the air. After the TP treatment, no *C. sakazakii* cells were detected in the kitchen, bedrooms, other rooms and the air previously contaminated by *C. sakazakii*. The bactericidal effect of the TP solution was quite obvious. To apply the TP treatment, the TP solution was painted to the contaminated object or sprayed into the surrounding environment.

Example 19. Use of TP Solution (0.3%) and Other Organic Acid to Clean Contaminated Rooms 0.3 g tea polyphenols and 0.3 g VC were dissolved in 100 mL NS. Kitchen, bedrooms and other rooms that were contaminated with *C. sakazakii* were treated with above TP solution for more than 1 hr. Samples were taken from contaminated kitchen, bedroom, other rooms and the air. After the TP treatment, no *C. sakazakii* cells were detected in the kitchen, bedrooms, other rooms and the air previously contaminated by *C. sakazakii*. The bactericidal effect of the TP solution was quite obvious. To apply the TP treatment, the TP solution was painted to the contaminated object or sprayed into the surrounding environment.

Example 20. Use of TP Solutions to Inactivate *C. sakazakii* in Dairy Products

*C. sakazakii* was treated with TP solutions as follows. The growth of the bacteria was observed.

A: 0.3 g tea polyphenols was added in 100 mL liquid milk, and the pH was adjusted to 3. The cell suspensions of *C. sakazakii* strains were added to obtain a final concentrations of approximately 8.0 Log CFU/mL, and the cells were incubated for 7 hr.

B: 0.5 g tea polyphenols was added in 100 mL liquid milk, and the pH was adjusted to 3.5. The cell suspensions of *C. sakazakii* strains were added to obtain a final concentrations of approximately 8.0 Log CFU/mL, and the cells were incubated for 7 hr.

C: 1 g tea polyphenols was added in 100 mL liquid milk, and the pH was adjusted to 4. The cell suspensions of *C. sakazakii* strains were added to obtain a final concentrations of approximately 8.0 Log CFU/mL, and the cells were incubated for 7 hr.

D: 3 g tea polyphenols was added in 100 mL liquid milk, and the pH was adjusted to 4.5. The cell suspensions of *C. sakazakii* strains were added to obtain a final concentrations of approximately 8.0 Log CFU/mL, and the cells were incubated for 7 hr.

E: 2 g tea polyphenols was added in 100 mL liquid milk, and the pH was adjusted to 5. The cell suspensions of *C. sakazakii* strains were added to obtain a final concentrations of approximately 8.0 Log CFU/mL, and the cells were incubated for 7 hr.

F: The cell suspensions of *C. sakazakii* strains were added into 100 mL liquid milk to obtain a final concentrations of approximately 8.0 Log CFU/mL, and the cells were incubated for 7 hr.

G: 0.5 g tea polyphenols was added in 100 mL yoghurt, and the pH was adjusted to 3. The cell suspensions of *C. sakazakii* strains were added to obtain a final concentrations of approximately 8.0 Log CFU/mL, and the cells were incubated for 7 hr.

H: 3 g tea polyphenols was added in 100 mL yoghurt, and the pH was adjusted to 4.5. The cell suspensions of *C. sakazakii* strains were added to obtain a final concentrations of approximately 8.0 Log CFU/mL, and the cells were incubated for 7 hr.

I: The cell suspensions of *C. sakazakii* strains was added into 100 mL yoghurt with a final concentrations of approximately 8.0 Log CFU/mL, and the cells were incubated for 7 hr.

J: 0.3 g tea polyphenols was added in 100 mL sour milk beverage, and the pH was adjusted to 5. The cell suspensions of *C. sakazakii* strains were added to obtain a final concentrations of approximately 8.0 Log CFU/mL, and the cells were incubated for 7 hr.

K: 1 g tea polyphenols was added in 100 mL sour milk beverage, and the pH was adjusted to 4. The cell suspensions of *C. sakazakii* strains were added to obtain a final concentrations of approximately 8.0 Log CFU/mL, and the cells were incubated for 7 hr.

L: 2 g tea polyphenols was added in 100 mL sour milk beverage, and the pH was adjusted to 3.5. The cell suspensions of *C. sakazakii* strains were added to obtain a final concentrations of approximately 8.0 Log CFU/mL, and the cells were incubated for 7 hr.

M: 3 g tea polyphenols was added in 100 mL sour milk beverage, and the pH was adjusted to 3. The cell suspensions of *C. sakazakii* strains were added to obtain a final concentrations of approximately 8.0 Log CFU/mL, and the cells were incubated for 7 hr.

N: The cell suspensions of *C. sakazakii* strains was added into 100 mL sour milk beverage, and obtained final concentrations was approximately 8.0 Log CFU/mL, and the cells were incubated for 7 hr.

O: 3 g tea polyphenols and 0.3 g VC were added in 100 mL sour milk beverage, and the pH was adjusted to 3. The cell suspensions of *C. sakazakii* strains were added to obtain a final concentrations of approximately 8.0 Log CFU/mL, and the cells were incubated for 7 hr.

P: 0.3 g tea polyphenols and 0.3 g malic acid were added in 100 mL sour milk beverage, and the pH was adjusted to 5. The cell suspensions of C. sakazakii strains were added to obtain a final concentrations of approximately 8.0 Log CFU/mL, and the cells were incubated for 7 hr.

Q: 1 g tea polyphenols and 0.3 g citric acid were added in 100 mL sour milk beverage, and the pH was adjusted to 5. The cell suspensions of C. sakazakii strains were added to obtain a final concentrations of approximately 8.0 Log CFU/mL, and the cells were incubated for 7 hr.

The cell suspensions in the treatment groups above was all C. sakazakii strains suspensions.

After serial dilution with the saline, 0.1 mL appropriately diluted cultures was spread-plated on TSA plates in duplicate and incubated upside down at 37° C. overnight. Finally, observe the number of *Cronobacter sakazakii* strains.

No *C. sakazakii* was detected in all groups treated with TP whereas *C. sakazakii* was detected in all the control groups without TP treatment. So tea polyphenols solution in the pH range 3-5 can effectively destroy *C. sakazakii*.

Example 21: Use of TP Solutions to Inactivate *C. sakazakii* in Vegetables

Vegetables were treated with *C. sakazakii* and TP solutions as follows. The growth of the bacteria was observed.

A: 1 mL of 8.0 Log CFU/mL cell suspensions of *C. sakazakii* strains was uniformly sprayed onto the vegetables. The vegetables were uniformly sprayed with 0.3% TP solution. The vegetable was treated for 2 hr before a sample was taken for the test.

B: 1 mL of 8.0 Log CFU/mL cell suspensions of *C. sakazakii* strains was uniformly sprayed onto the vegetables. The vegetables were uniformly sprayed with 1% TP solution. The vegetable was treated for 2 hr before a sample was taken for the test.

C: 1 mL of 8.0 Log CFU/mL cell suspensions of *C. sakazakii* strains was uniformly sprayed onto the vegetables. The vegetables were uniformly sprayed with 3% TP and 1% malic acid. The vegetable was treated for 2 hr before a sample was taken for the test.

D: 1 mL of 8.0 Log CFU/mL cell suspensions of *C. sakazakii* strains was uniformly sprayed onto the vegetables. The vegetables were uniformly sprayed with 2% TP and 1% citric acid. The vegetable was treated for 2 hr before a sample was taken for the test.

E: 1 mL of 8.0 Log CFU/mL cell suspensions of *C. sakazakii* strains was uniformly sprayed onto the vegetables. The vegetables were uniformly sprayed with 3% TP and 1% VC. The vegetable was treated for 2 hr before a sample was taken for the test.

F: 1 mL of 8.0 Log CFU/mL cell suspensions of *C. sakazakii* strains was uniformly sprayed onto the vegetables. The vegetables were uniformly sprayed with 3% TP and 1% malic acid and 1% citric acid. The vegetable was treated for 2 hr before a sample was taken for the test.

G: 1 mL of 8.0 Log CFU/mL cell suspensions of *C. sakazakii* strains was uniformly sprayed to the vegetables. The vegetable was treated for 2 hr before a sample was taken for the test.

After treatment, samples taken from the vegetables were spread-plated on TSA plates and incubated upside down at 37° C. overnight. Finally, the number of *Cronobacter sakazakii* colonies on the TSA plates were counted.

In all the groups treated with TP, no *Cronobacter sakazakii* have not been detected. In the groups without TP treatment, *Cronobacter sakazakii* colonies have been detected on the TSA culture.

Example 22. Use of TP Solutions to Inactivate *C. sakazakii* in Cereals

Cereals were treated with *C. sakazakii* and TP solutions as follows. The growth of the bacteria was observed.

A: 1 mL of 8.0 Log CFU/mL cell suspensions of *C. sakazakii* strains was uniformly sprayed onto cereals. The cereals were uniformly sprayed with 0.5% TP. The cereal was treated for more than 1 hr before a sample was taken for the test.

B: 1 mL of 8.0 Log CFU/mL cell suspensions of *C. sakazakii* strains was uniformly sprayed onto cereals. The cereals were uniformly sprayed with 0.3% TP. The cereal was treated for more than 1 hr before a sample was taken for the test.

C: 1 mL of 8.0 Log CFU/mL cell suspensions of *C. sakazakii* strains was uniformly sprayed onto cereals. The cereals were uniformly sprayed with 3% TP and 1% malic acid. The cereal was treated for more than 1 hr before a sample was taken for the test.

D: 1 mL of 8.0 Log CFU/mL cell suspensions of *C. sakazakii* strains was uniformly sprayed onto cereals. The cereals were uniformly sprayed with 2% TP and 1% citric acid. The cereal was treated for more than 1 hr before a sample was taken for the test.

E: 1 mL of 8.0 Log CFU/mL cell suspensions of *C. sakazakii* strains was uniformly sprayed onto cereals. The cereals were uniformly sprayed with 1% TP and 1% VC. The cereal was treated for more than 1 hr before a sample was taken for the test.

F: 1 mL of 8.0 Log CFU/mL cell suspensions of *C. sakazakii* strains was uniformly sprayed onto cereals. The cereals were uniformly sprayed with 3% TP and 1% malic acid and 1% citric acid. The cereal was treated for more than 1 hr before a sample was taken for the test.

G: 1 mL of 8.0 Log CFU/mL cell suspensions of *C. sakazakii* strains were uniformly sprayed to the cereal. The cereal was treated for more than 1 hr before a sample was taken for the test.

After treatment, samples taken from the cereal were spread-plated on TSA plates and incubated upside down at 37° C. overnight. Finally, the number of *Cronobacter sakazakii* colonies on the TSA plates were counted.

In all the groups treated with TP, no *Cronobacter sakazakii* have not been detected. In the groups without TP treatment, *Cronobacter sakazakii* colonies have been detected on the TSA culture. These results demonstrate that TP has bactericidal effect against *Cronobacter sakazakii* and can be applied to eliminate *Cronobacter sakazakii* in vegetables and cereals.

While the present invention has been described in some detail for purposes of clarity and understanding, one skilled in the art will appreciate that various changes in form and detail can be made without departing from the true scope of the invention. All figures, tables, appendices, patents, patent applications and publications, referred to above, are hereby incorporated by reference.

What is claimed is:

1. A method for inactivating *Cronobacter sakazakii*, comprising:
   1) treating *Cronobacter sakazakii* contaminants with a tea polyphenol solution containing tea polyphenols dissolved in normal saline or water to inactivate *Cronobacter sakazakii*; wherein the tea polyphenols solution is 0.3%-3% and the pH is adjusted to be 3-5 or
   2) treating *Cronobacter sakazakii* contaminants with a tea polyphenol solution containing tea polyphenols and other antibacterial reagents dissolved in normal saline or water to inactivate *Cronobacter sakazakii* wherein the tea polyphenols solution is 0.3%-3% and the pH is adjusted to be 3-5.

2. The method of claim 1, wherein the mass concentration of the tea polyphenol solution is 0.3%~3%.

3. The method of claim 1, wherein the other antibacterial reagents are one or more reagents selected from ascorbic acid, malic acid or citric acid.

4. The method of claim 1, comprising:
   1) dissolving 0.3%~3% tea polyphenols in normal saline or water to make a tea polyphenol solution, and treating *Cronobacter sakazakii* contaminants with the tea polyphenol solution for no less than 1 hour to inactivate *Cronobacter sakazakii*; or
   2) dissolving 0.3%~3% tea polyphenols and other antibacterial reagents in normal saline or water to make a mixture solution, and treating *Cronobacter sakazakii* contaminants with the mixture solution for no less than 1 hour to inactivate *Cronobacter sakazakii*, wherein the other antibacterial reagents are one or more reagents selected from ascorbic acid, malic acid, or citric acid.

5. The method of claim 1, wherein the tea polyphenol solution is used to treat food or food processing equipment/environment contaminated with *Cronobacter sakazakii*.

6. The method of claim 5, wherein the tea polyphenol solution is painted onto or sprayed into the contaminated food processing equipment/environment.

* * * * *